United States Patent [19]

d'Entremont

[11] Patent Number: 5,712,962
[45] Date of Patent: Jan. 27, 1998

[54] GRAY SCALE ADD-ON

[75] Inventor: Alice M. d'Entremont, Boston, Mass.

[73] Assignee: Canon, Inc., Tokyo, Japan

[21] Appl. No.: 455,144

[22] Filed: May 31, 1995

Related U.S. Application Data

[63] Continuation of Ser. No. 99,401, Jul. 30, 1993, abandoned, which is a continuation of Ser. No. 636,567, Jan. 7, 1991, abandoned, which is a continuation of Ser. No. 220,484, Dec. 8, 1987, abandoned.

[51] Int. Cl.⁶ .................................................. G06K 1/00
[52] U.S. Cl. ............................................................ 395/107
[58] Field of Search .................................... 395/101, 107, 395/106, 112; 346/154; 358/283, 284, 83; 400/63; 364/200 M, 900 S

[56] References Cited

U.S. PATENT DOCUMENTS

| | | | |
|---|---|---|---|
| 4,589,144 | 5/1986 | Namba | 382/61 |
| 4,651,287 | 3/1987 | Tsao | 364/519 |
| 4,653,020 | 3/1987 | Cheselka | 364/900 |
| 4,682,190 | 7/1987 | Ikeda | 346/154 |
| 4,704,725 | 11/1987 | Harvey et al. | 380/9 |
| 4,736,309 | 4/1988 | Johnson et al. | 364/521 |
| 4,782,399 | 11/1988 | Sato | 358/280 |
| 4,802,105 | 1/1989 | Suzuki | 364/519 |
| 4,829,470 | 5/1989 | Wang | 364/900 |
| 4,831,392 | 5/1989 | Dei | 364/519 |
| 4,845,640 | 7/1989 | Ballard et al. | 364/518 |
| 4,866,534 | 9/1989 | Tada | 358/456 |
| 5,113,492 | 5/1992 | Ariki et al. | 395/147 |
| 5,214,750 | 5/1993 | Minowa et al. | 395/111 |

*Primary Examiner*—Phu K. Nguyen
*Attorney, Agent, or Firm*—Fitzpatrick, Cella, Harper & Scinto

[57] ABSTRACT

A system for providing gray scale modulation signals to the drive circuit of a laser printer having a source of printer video timing signals, a printer video drive circuit, a memory for storing a raster bit map that can be read out in accordance with the timing signals, and a source of flag signals. The system includes another memory for storing a plurality of multibit bytes each encoding a corresponding gray scale value, and an address generator for relating the timing of the operation of the system to the timing of operation of said raster bit map memory. A Modulator is included for converting the gray scale values to a stream of pulse-width-modulated signals. A logic switch is included and is responsive to each flag signal for selectively feeding either the stream of pulse-width-modulated signals or the raster bit map to the drive circuit.

31 Claims, 2 Drawing Sheets

GRAY SCALE ADD-ON

This application is a continuation of application Ser. No. 08/099,401 filed Jul. 30, 1993, now abandoned, which is a continuation of application Ser. No. 07/636,567, filed Jan. 7, 1991, now abandoned, which is a continuation of application Ser. No. 07/220,484, filed Dec. 8, 1987, now abandoned.

This invention relates to printing of gray scale images, and more particularly to means for and method of gray scale modulation of a laser printer output without substantial alteration of the basic preexisting circuitry driving the printer.

Among currently commercially available horizontal line-raster printers are laser printers in which a laser beam is focussed to a small spot on a xerographic surface. The beam is modulated, usually on-off, by an electrical signal, while being swept along a first line between the margins of the surface. The beam is returned to the-original margin with a small displacement normal to the sweep line so as to be disposed for sweeping along a second line parallel to the first. The image formed on the xerographic surface can be transferred to another surface, such as paper, by known techniques to make a "hard-copy".

Another category of line-raster printers uses a laser beam or light from a fiber optic cathone ray tube to make a printable image on a photosensitive film. The film may then be used to make a printing plate for document reproduction in a conventional press.

In conventional laser printing of text and line art, a bit map is typically generated by a processing unit disposed either inside or outside the laser printer. The complexity of the final output as well as the time required to produce the final raster image from the bit map is a function of the sophistication of the processing unit and the bandwidth of transmission. The resulting bit map image produced by the printer, however, is a function of the resolution of the printer, and consists of printer pixels i.e. a series of "ones" and "zeros" in the form of dots formed by deposit or no deposit of toner on the paper. Thus, assuming that the resolution of a printer in dots/inch is R, the width of the page to be printed is W inches, the length of that page is L inches and the number of bits in each byte stored in the memory is B, for a typical bit map the memory requirements can be determined as follows. Each line produce by the printer then is a sequence of m words where $m = R/B \times W$ The page will have n lines where $n = R \times L$ The total memory needed is then $mn/B$ or $R^2 LW/B^2$ To reproduce an original continuous tone image, the latter can be digitized into an array of multibit numbers, each representing the level of gray within a limited area or gray tone pixel in the continuous tone image. Typically, six-bit binary numbers would permit representation of the gray tone pixels across a spectrum of 64 levels of gray values. As well known to those skilled in the art, printed reproduction of continuous tone images on paper generally involves the use of half-tone patterns, a family of small shapes, typically dots or lines printed at regular intervals, such as 100 dots per inch (dpi). Half tone patterns can be reproduced by a line-raster printer by dividing the page to be printed into a plurality of small, equal-sized cells each having a cluster of printed dots or printer pixels arranged therein. Each such cluster corresponds to a continuous tone pixel in the original image and being formed of a number of printer pixels, is thus dubbed hereinafter a "super-pixel". In order to achieve a gray scale effect, the number of dots in each super-pixel is related to a corresponding value of a continuous gray tone pixel. All of these techniques being dependent on the resolution of the printer, the resulting quality is also limited by that resolution.

The number of gray levels is determined by the maximum number of printer dots of which a super pixel is formed. For example, in a 300 dpi printer, one could create 3×3 super pixels at 100 per inch each having up to 9 levels of gray or a 4×4 super pixel at 25 per inch, each having up to 16 levels, or a 5×5, at 60 pixels per inch, each having up to 25 levels and so on. The problem is that both the number of super pixels per inch and the number of gray levels must be increased for increasing quality with this prior art method, the only way of achieving increased quality is by increasing the total number of dots per inch from the printer, which means more exacting technology and accompanying higher costs. For example, to obtain 64 gray levels at 100 superpixels/inch would require an 800 dpi printer. Furthermore, the increased resolution of the laser printer requires greater capabilities from the processing unit and larger bit map memories. Printers providing 300 to 400 dpi can yield reasonable quality results in line art and text under the conventional bit map approach but give poor results in gray image output. A great number of very effective solutions have been worked out for the line art and text printing and are in wide use, but there appears to be no current inexpensive technique for providing quality gray values for tone reproduction.

A primary purpose of the present invention is to provide cost effective implementation of present line-raster printers which maintains the established work done on bit maps for text and line art information, but offers a simple addition to implement better quality grays than can be obtained from the usual bit map.

The principal object of the present invention is to combine effectively the conventional method of driving a laser printer from a bit map memory with a different drive required by gray modulation, without the necessity of substantially changing any of the predesigned circuitry. Thus commercially available printers such as the "Laserwriter" printer of Apple Computer Inc., Cupertino, California, or the "Laserjet" printer of Hewlett Packard Co., Sunnyvale, Calif. (currently a 300 dpi printer) without having to alter their 300 dpi bit maps, can, with the addition of the small circuit of the present invention, produce gray images of quality achievable only on printers having 600 to 800 dpi resolutions.

To achieve the foregoing and other objects, the present invention generally includes a memory storing gray scale values defined in multibit bytes, an address generator relating the bit map memory of the standard circuitry to the gray scale memory, a logic switch driven from the gray scale memory, and gray scale modulating circuitry for converting digital gray scale values to pulse width modulated signals to be used to drive the printer. Selection of memories is done through a flag bit identified by the host software and contained in the gray scale memory, according to which a half or full tone picture and the location at which the picture .elements are to be printed on the page, are determined alternatively with the printing of the bit map information.

Other objects of the present invention will in part be obvious and will in part appear hereinafter. The invention accordingly comprises the construction, combination of elements and arrangement of parts exemplified by the following detailed disclosure and the scope of the application of which will be indicated in the claims.

For a fuller understanding of the nature and objects of the present invention, reference should be had to the following detailed description taken in connection with the accompanying drawings in which like numerals denote like parts and wherein.

Figure 1:
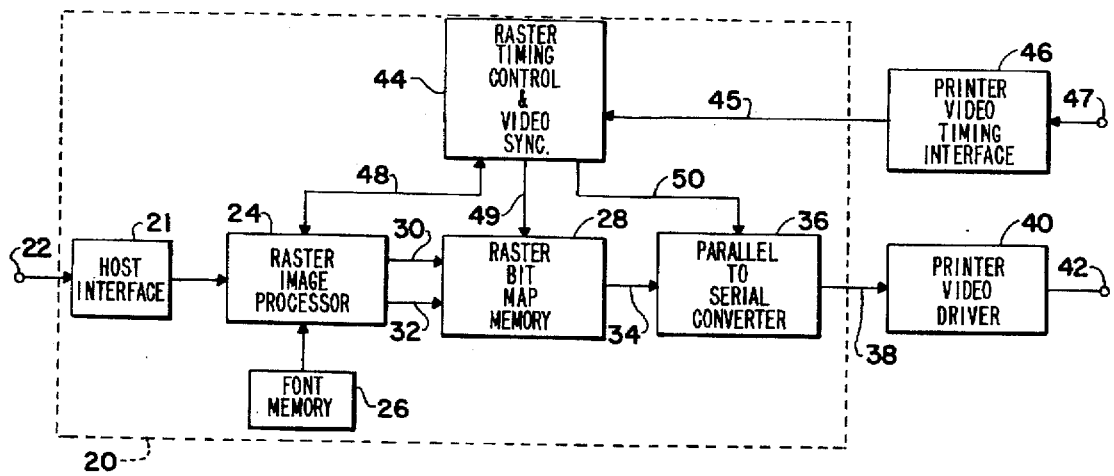
FIG. 1 is a block diagram illustrating a typical prior art raster bit map printer system.

The general circuitry of a prior art raster line printer with which the present invention finds particularly useful application, is shown in the block diagram in FIG. 1. The circuit of prior art raster bit map system 20, typically found in commercially available laser printers, includes host interface 21 having an input signal terminal 22 at which a signal from a digital computer or host may be applied when indicated by the host software. Such interface circuits are well known in the art, and are of course device specific, being means for providing electrical interconnection between the device from which information is being sent to be printed (e.g. a computer) to the printer so that the signals are presented to the latter in a format and at voltage levels and with such timing as to permit the printer to be operated responsively to the outputs from any of a number of different types of computers. The output signals from interface 21, embodying information with respect to text (e.g. ASCII code), vectors, images, codes and the like, usually in the form of six or eight bit bytes, are formatted by typically one of several known page descriptive languages used to designate where the information is to be placed on a printed page. That information is fed to a raster image processor 24 that generates from input data, a linear code representing an image. Such a processor is typically a 68020 integrated circuit chip (IC) available from Motorola, Inc. with an internal read-only memory (ROM). Coupled to processor 24 is font memory 26, typically also a ROM, which provides stored font change characters that select and make effective a change in the specific shape, size or both of the graphics for a set of graphemes usually of an alphanumeric character set, these characters being made available to processor 24 for establishing the type face and character size of the text to be produced by the printer.

The printer system shown in FIG. 1 also typically includes raster bit map memory 28 connected for linearly storing the output of processor 24 provided respectively as a stream of data on first input line 30 and a stream of addresses on second line 32. The output of memory 28 is connected through line 34, usually a group of parallel leads, so that each byte (e.g. of eight bits) is presented to the input of converter 36 as a group of parallel signals and converted by converter into a serial signal train on line 38. The latter in turn is connected to the input of printer video driver 40 for introduction into input terminal 42 of a laser printer (not shown). The operation of the embodiment of FIG. 1 is controlled in accordance with timing signals derived from the laser printer at terminal 47 and fed through timing interface 46 through line 45 to raster timing control circuit 44. The latter, as well known to those skilled in the art, serves to synchronize operations in the circuit of FIG. 1 in accordance with page start, line start and video sync signals of the laser printer.

In one embodiment of the present invention, intended as an "add-on" for use with a typical prior art raster bit map system 20 circuit as shown in FIG. 1, another host interface 52 is provided and connected to terminal 50 to accept another sequence of signals in the form of n-bit bytes where n is an integer greater than 3 and typically 6 or 8, containing gray scale information and flag bits as described in more detail hereinafter. It will be appreciated that the format of the gray scale information and the occurence of the flag or control bits is according to the page description language or software employed. The flag bits can be provided by a host computer or may be prestored in a ROM or the like. The purpose of the flag bits, as will be described hereinafter, is to determine the location on the ultimate printed page of pictures embodying the gray scale information. Such information can be the direct output of a video scanner or the like, and can also be the output of a host computer, the software of which directs gray scale information to terminal 50 and other information such as text, line drawing data and the like to terminal 22. The output from interface 52 is coupled through line 53 to the input of linear gray image memory 54 wherein the gray scale information is stored at predetermined addresses. The internal organization of memory 54 will be described hereinafter. Address generator 56 is connected through line 57 to a control input of gray image memory 54 for addressing the contents of the latter and for relating the contents of gray image memory 54 with the raster bit map memory 28 in system 20 through timing signals originating in common in the laser printer.

The timing of the addressing of memory 54 by address generator 56 is controlled by gray memory timing control circuit 58, the latter being connected to the input of generator 56 through line 59. In turn, the input of timing control circuit 58 is connected through line 60 so that the latter can be driven synchronously by the same video timing signals used to control raster bit map system 20, such as page start signal, line sync signals and the video clock derived from the printer through printer video interface 44. The output of memory 54 is connected through line 62 to the input of data register 63, the latter being controlled also by timing controller 58 through signals along line 65. The output of data register 63 is divided to provide one output line 66 along which a flag signal can be sent to control the switching of a logic switch such as video gate 68. Register 63 includes second output line 69 along which gray scale data is to be sent. Line 69 is connected to the input of a digital-to-analog (D/A) converter 70 which converts the digital input into an analog output signal at terminal 72. The latter is connected to the input of gray scale generator 74, the timing of the operation of which is also controlled by suitable connection through line 75 to controller 58, the output of the latter being connected through line 76 to the input of printer video driver 40 to supply selectively information from either raster bit map system 20 along line 38, or gray information from gray scale generator 74 along line 78.

Gray scale generator 74 is preferably a device that provides mapping of a video input signal to a pulse-width-modulated signal. To that end one may use any of a number of known circuits such as the circuit disclosed in U.S. Pat. No. 3,916,096 in which an analog video signal is compared with a repetitive triangular or sawtooth wave in a comparator to produce a signal that is pulse-width modulated in accordance with amplitude of the video signal.

It will be appreciated that the circuitry of the present invention can be directly built in or integrated with a raster bit map system of a laser printer, with consequent savings due to sharing of several elements such interfaces, timing controls and the like.

In operation, the signals introduced at input terminal 50 are n-bit bytes, one bit of each being a flag bit and the remaining n−1 bits being gray scale information covering a range of $2^{n-1}$ levels of values of gray. The value of n should be 3 or greater and preferably is either 6 or 8. Each signal will be here considered for exemplary purposes to be in the form of eight bit words or bytes, each representing a particular gray level of a pixel in an original image are received at terminal 50 and transmitted typically eight bits in parallel, i.e. one byte at a time on eight parallel lines, to interface 52. The signals are passed by the latter and stored as a linear byte map in memory 54. For example, assuming that the original information is at a resolution of 100 pixels per inch on an 8½"×11" page then the total information stored for that page is 935 kilobytes.

The size of gray scale memory 54 is typically much smaller than the size of memory 28, the latter being minimally the size of the page to be produced times the required number of gray super pixels. The only restriction on the number of gray super pixels per inch is that it be an integral value of the printer resolution. The number of grays achievable, unlike the bit map method, is independent of the number of gray scale pixels per inch. Illustrative examples of size of gray memory 54 are shown in Table as follows:

TABLE I

| Printer Resolution (dots/inch) | Bit Map Memory Size for (8 × 10)"² Page | Gray Pixel Resolution (pixels/inch) | Gray Pixel Memory for 8 × 10 Page | Printer Gray Scale Factor |
| --- | --- | --- | --- | --- |
| 400 | 1.6 MB | 200 | 3.2 MB | 2 |
| 400 | 1.6 MB | 100 | 800 kB | 4 |
| 400 | 1.6 MB | 80 | 512 kB | 5 |
| 400 | 1.6 MB | 50 | 200 kB | 8 |
| 300 | 900 kB | 150 | 2.25 MB | 2 |
| 300 | 900 kB | 100 | 800 kB | 3 |
| 300 | 900 kB | 75 | 450 kB | 4 |
| 300 | 900 kB | 60 | 288 kB | 5 |

Figure 2:
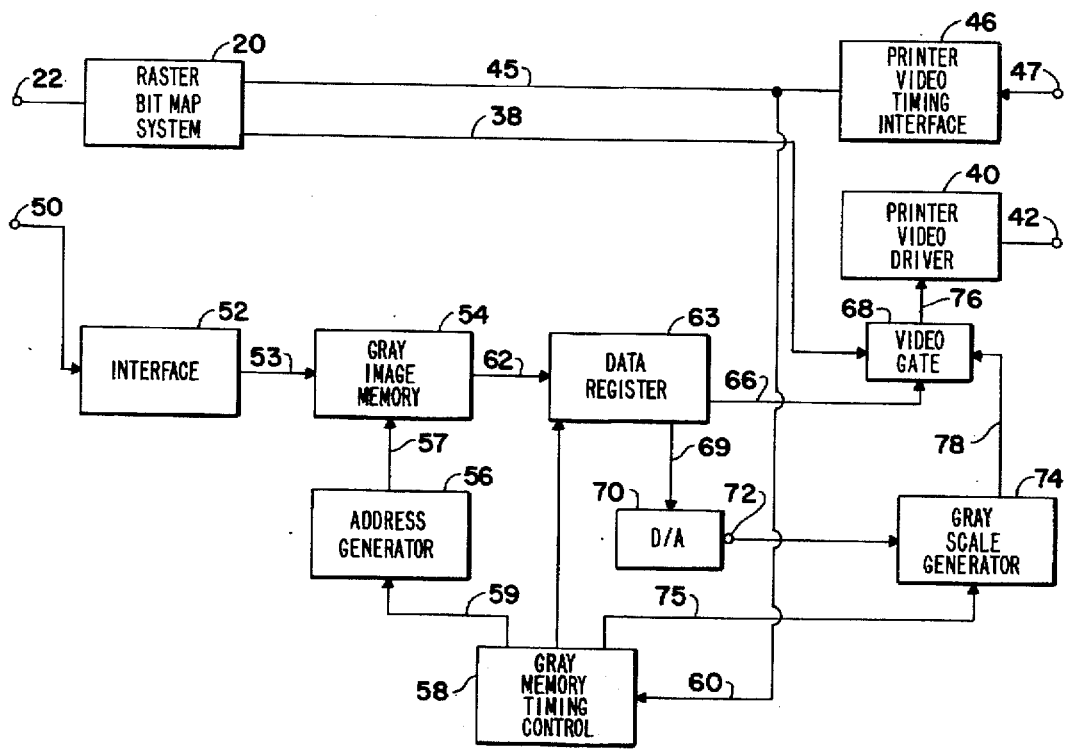
FIG. 2 is a block diagram illustrating the principal parts of a system embodying the principles of the present invention and particularly useful in connection with a bit map system such as is shown in FIG. 1.

Upon receipt of a print command from the operator, all timing of the circuit of FIG. 2 is controlled by signals originating in the printer and received at input terminal 47 of timing interface 46. It should be noted that although gray image memory 54 and bit map memory 28 are not equal in size, both derive their address clocks from the laser printer clocks. Thus, both memories require a sequential read from beginning to end of page and also the relative numbers are related by integer values. Hence, synchronization is not difficult to achieve.

A sequence of timing pulses provided by the printer through interface 46 is a function of the number of gray superpixels per inch to be produced and the dpi of the printer. The exemplary timing pulse train shown in FIG. 3A is based on a 400 dpi printer with 100 gray pixel/inch capability. In this example the following numbers hold for an 8×10"² page.

|  | Bit Map Memory | Gray Pixel Memory |
| --- | --- | --- |
| Number of Address Cycles per Line | 400/8 bits × 8" = 400 | 100 × 8" = 800 |
| Number of Lines per Page | 400 × 10" = 4000 | 100 × 10" = 1000 |

Bit map memory 28 in system 20 has to be read out at a dpi rate (e.g. 300 words across the page but 3300 lines in the vertical direction) in accordance with a sequence of read signals shown in FIG. 3B and provided by controller 44, but the byte map or gray image memory in memory 54 is read out at a different rate (e.g. 800 words across the page but only 1100 lines in the vertical direction) in accordance with the read signals shown in FIG. 3C and provided by controller 58.

Figure 3:
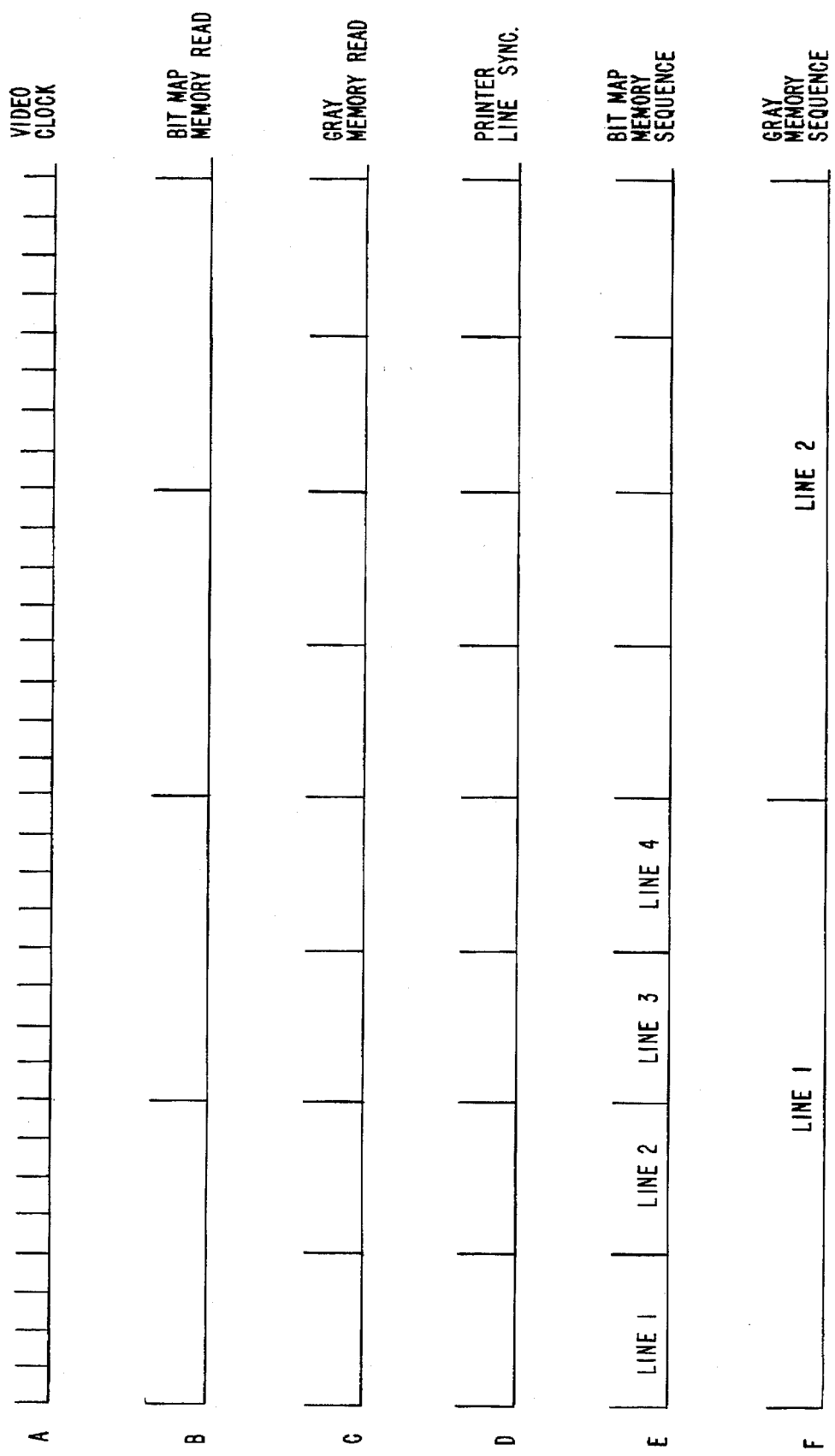
FIG. 3 is a timing diagram showing pulse timing in the system of FIG. 2.

The algorithm for reading memory 54 can be implemented in controller 58 by a low cost microprocessor and an in modulo counter for the memory read pulse train shown in FIG. 3C and derived from the video clock. The counts at which memory 54 is to be read is determined by both the number of pixels in each line and the number of dots to be produced by the printer. The memory addresses of a particular horizontal line are thus repeated for the appropriate number of times according to the gray modulation required. For example, from Table I, for a 400 dpi printer, 100 gray pixels/inch, the memory must be read on every 4th video clock pulse as shown in FIG. 3C, so that such line is then repeated 4 times. Therefore twice as many address cycles need to be generated for the gray memory per line than for the bit map memory, and further the same addresses must be the same for 4 lines as shown in FIG. 3 F, the gray memory sequence signals generated by controller 58.

The information read out of memory 54 is transferred over line 62, again as eight parallel bits per byte to data register 63. A bit (e.g. the most significant bit) of each byte of gray information is predesignated by the host software to constitute a flag bit, the remaining seven bits of each byte then containing the gray information. It will be appreciated that such seven bits may designate up to 128 levels of gray. The purpose of the flag bit is to control what information is to be printed by the laser printer as will be described hereinafter. Data register 63 serves to separate the gray information from the flag bit of each byte, inasmuch as when the register is read out, the line on which the most (or least as the case may be) significant bit appears will provide the desired flag bit. The gray scale information, in the form of a seven parallel bit word or byte is fed to converter 72, the flag bit being fed to the control terminal of video gate 68, all under the control of signals from gray memory timing control 58. The parallel bits of the gray information are converted in converter 72 to an analog signal, the amplitude of which is determined by the value of the byte converted.

The amplitude of the output signal from converter 72 is then mapped into a pulse-width-modulated signal by generator 74 and applied on line 78 to one data input terminal of video gate 68. The other data input terminal of gate 68 is connected to the data output of raster bit map system 20. The gate serves to switch its output from bit map drive to gray scale drive on a line-per-line basis by connecting either one or the other of its data inputs to the input terminal of printer video driver 40 in accordance with the nature of the flag bit then at the control terminal of the gate. For example, assuming that the flag bit is the most significant bit of each byte, then so long as a sequence of is appears at the control terminal of gate 68, the latter will only transmit gray scale information from gray modulator or generator 74 to driver 40. As soon as the flag bit changes to 0, gate 68 will then start transmitting information from the raster bit map in system 20 to driver 40.

The operation of the flag bit can advantageously be described in connection with an exemplary 8½ inch by 11 inch page to be printed with combined text and an image with a 100 dpi printer in 100 gray pixels or superpixels/inch. One can assume that the exemplary location of the picture or image on that page is in a 2"×3" light locate 1" below the top of the page and 1" from the left margin. Because the two memories are linear, one can assign Cartesian coordinates to the page as follows: the top left corner 1,1; the top right corner 850,1; the bottom left corner, 1,1100; and the bottom right corner 850, 1100. Thus, line 1 of the printing (pixels 1 to 850) will be entirely text material derived from bit map memory 28 and fed to driver through video gate 68 because the flag bit will be 0. Similarly, the information used to generate pixels 851 to 1700 (on line 2) and so forth through pixel 850,100 will all be derived from the bit map memory. However, at this point the printing has reached the top left hand point on the margin of the light and the flag bit changes to t, so pixels 850,100 to 850,300 are superpixels embodying information provided from gray image memory 54 through register 63. This insures that the first line of the desired picture will be printed as the top line of the light. At pixel 850,301, the right hand margin of the light, the flag bit changes to 0 again and the printer resumes printing from the bit map memory until the flag bit again changes when the printer again reaches the left margin of the light. The switching between flag bits will coninute until the last pixel representing the lower right hand corner of the image light has been reached. After that, none of the bytes in memory 54 will contain a flag bit of 1, so all further material printed on the page will be derived from the bit map memory alone.

The advantages of this system are numerous. For one, the system requires no manipulation of data such as real time computing during printing inasamuch as all of the control or flag signals are provided beforehand as part of the gray bytes stored in gray image memory 54. The flag bits in the stream from register 63 will a priori establish the x-y location of each margin of the desired picture. Another important advantage is that the system requires the smallest amount of memory that can be juxtaposed on the existing bit map memory To achieve these same results by juxtaposing a higher resolution bit map for gray values in place of the byte map of the present invention would require a minimum of nine times as much memory for a 300 dpi printer.

To achieve similar quality gray results from a higher juxtaposed bit map would require the bit map word to be expanded from 8 bits as shown in Table II to a greater number of bits depending on the gray pixel resolution required and the number of levels of gray values. For example, a 64 gray level, 100 pixels/inch system would require a minimum of 24 bits at 400 dpi, the required size of the bit map memory then being increased by a factor of twelve. In a 400 dpi printer, this would be 3.8 Mbytes as contrasted to the present invention which requires only 800 Kbytes.

The most significant advantage is that the gray capability can be incorporated in any existing laser printer currently being driven from bit maps with minimal hardware and software changes, and that further the choice of quality is printer resolution independent and determined only by user choice.

If the printer has a postscript interpreter processor, the image operator can directly drive gray modulator 74 by setting the required flag bit in the image array memory. The depth of the gray memory is arbitrary provided that the most (or least) significant bit is retained as a flag bit. To extrapolate to color, each color plane would have a separately coded flag bit but depending on the color implementation algorithm employed, would be of different depth or could share a flag bit. For example, one could define a flag byte instead of a flag bit. Using a flag byte of 2 bits (e.g. the most significant bit and the next most significant bit of an eight bit byte) one could specify three different colors (e.g. three primaries) with those two bit bytes that contain at least one bit of 1, over a gray scale of 64 levels specified by the remaining six bits of each eight bit byte. In such case, the video gate would be somewhat more complex to control not only the stream gray information, but the particular color for which the information is being provided.

Since certain changes may be made in the above apparatus and process without departing from the scope of the invention herein involved, it is intended that all matter contained in the above description or shown in the accompanying drawing shall be interpreted as illustrative and not in a limiting sense.

What is claimed is:

1. A system for providing, in response to flag signals from a flag signal source, gray scale modulation signals to a laser printer having a source of printer video timing signals, a printer video drive circuit and a raster bit map memory for storing a raster bit map that can be read out in accordance with said printer video timing signals, said system comprising:

a gray scale image memory for storing a plurality of multibit bytes each encoding a corresponding gray scale value and flag data;

an address generator for addressing said gray scale image memory to read out said multibit bytes of gray scale values in accordance with said printer video timing signals;

modulating means for converting said gray scale values to a stream of analog pulse-width-modulated signals; and logic switch means, receiving the flag data from said gray scale image memory, for selectively feeding either said stream of analog pulse-width-modulated signals obtained from said modulating means or the contents of said raster bit map to said printer video drive circuit in accordance with the flag data received from said gray scale image memory.

2. A system as defined in claim 1, wherein one bit of each of said multibit bytes is a flag bit which represents a corresponding one of said flag signals, and the remaining bits of each said multibit byte encode such bytes said corresponding gray scale value.

3. A system as defined in claim 2, wherein said flag bit is the most significant bit of each of said bytes.

4. A system as defined in claim 2, wherein said flag bit is the least significant bit of each of said bytes.

5. A system according to claim 1, wherein the raster bit map memory and said gray scale image memory are separate memories.

6. An image processing apparatus coupled to image reproducing means, said apparatus comprising:

non-gray scale data generating means for generating data that is not gray scale data;

gradation processing means for gradation-processing the gray scale data generated by said gray scale data generating means to provide an analog pulse-width-modulated signal; and applying means, receiving the flag data from said gray scale generating means, for selectively applying either the data that is not gray scale data or the analog pulse-width-modulated signal obtained from said gradation processing means to the image reproducing means to reproduce a visible image in accordance with the received flag data.

7. An apparatus according to claim 6, wherein said non-gray scale data generating means comprises bit map memory means for generating the non-gray scale data.

8. An apparatus according to claim 6, wherein said gray scale generating means comprises gray scale image memory means for storing the gray scale data and flag data corresponding to the gray scale data.

9. An image processing apparatus according to claim 6, further comprising a memory for storing the non-gray scale data and the gray scale data.

10. An image processing apparatus according to claim 9, wherein said memory comprises a bit map memory storing the non-gray scale data and a gray scale image memory storing the gray scale data, wherein said bit map memory and said gray scale image memory are separate memories.

11. An image controller connected to an output device and a host computer, the output device being capable of producing a synchronizing signal, said image controller comprising:

means for receiving first binary image data from the host computer;

a bit map memory for storing the first binary image data;

a multi-bit memory for storing multi-bit image data representing a gray scale image and flag data;

conversion means for converting the multi-bit image data into second analog pulse-width-modulated image data in response to the synchronizing signal produced by the output device;

means for reading out the first binary image data also in response to the synchronizing signal;

means, receiving the flag data from said multi-bit memory, for synthesizing the first image data and the second analog pulse-width-modulated image data into a synthesized image signal in accordance with the received flag data by selecting either the first image data or the second pulse-width-modulated image data to be sent to the output device in accordance with the received flag data; and means for outputting the synthesized image signal to the output device.

12. An image controller according the claim 11, wherein said synthesizing means outputs the synthesized image signal to a laser printer.

13. An image controller according to claim 11, wherein said bit map memory and said multi-bit memory are separate memories.

14. An image controller connected to an output device and a host computer, the output device being capable of producing a synchronizing signal, said image controller comprising:

means for receiving first binary image data from the host computer;

a bit map memory for storing the first binary image data;

a multi-bit memory for storing multi-bit image data representing a gray scale image and flag data;

conversion means for converting the multi-bit image data into second analog pulse-width-modulated image data;

means for reading out the first binary image data in response to the synchronizing signal produced by the output device, said conversion means operating to convert the multi-bit image data in synchronization with the reading out operation of said reading out means;

means, receiving the flag data from said multi-bit memory, for synthesizing the first image data and second analog pulse-width-modulated image data into a synthesized image signal in accordance with the flag data by selecting either the first image data or the second pulse-width-modulated signal to be sent to the output device in accordance with the received flag data; and means for outputting the synthesized image signal to the output device.

15. An image controller according to claim 14, wherein said synthesizing means outputs the synthesized image signal to a laser printer.

16. An image controller according to claim 14, wherein said bit map memory and said multi-bit memory are separate memories.

17. An image processing apparatus coupled to image reproducing means, said apparatus comprising:

text data receiving means for receiving text data in the form of code;

converting means for converting the text data to bit map data;

image data receiving means for receiving image data and flag data, wherein image data representing each pixel of an image represented by the image data has at least two bits representing a halftone image;

modulating means for modulating the image data to produce an analog pulse-width-modulated signal; and providing means, receiving the flag data from said image data receiving means, for providing an image signal comprising the bit map data and the analog pulse-width-modulated signal to the image reproducing means, said providing means selecting either the bit map data or the analog pulse-width-modulated signal to be provided to the image reproducing means in accordance with the received flag data.

18. An image processing apparatus according to claim 17, further comprising bit map memory means for storing the bit map data.

19. An image processing apparatus according to claim 17, further comprising image memory means for storing the image data.

20. An image processing apparatus according to claim 17, wherein said image data receiving means receives flag data which indicates that received data is the image data.

21. An image processing apparatus according to claim 20, wherein said providing means providing the pulse-width-modulated signal to the image reproducing means based on the flag data.

22. An image processing apparatus according to claim 17, further comprising a memory storing the image data and the bit map data.

23. An image processing apparatus according to claim 22, wherein said memory comprises a bit map memory storing the bit map data and an image memory for storing the image data, wherein said bit map memory and said image memory are separate elements.

24. An image reproducing apparatus connected to a host computer, said apparatus comprising:

receiving means for receiving text data in code form, image data, and flag data in the image data, wherein image data representing each pixel of an image represented by the image data has at least two bits of data;

converting means for converting the text data to bit map data;

modulating means for modulating the image data to produce an analog pulse-width-modulated signal; and reproducing means for reproducing an image comprising a first image based on the bit map data and a second image based on the analog pulse-width-modulated signal, said reproducing means receiving the flag data from said receiving means and reproducing at a predetermined time either the first image based on the bit map data or the second image based on the pulse-width-modulated signal, in accordance with the received flag data.

25. An image reproducing apparatus according to claim 24, wherein said receiving means also receives a flag signal indicating whether the received data is the text data or the image data.

26. An image reproducing apparatus according to claim 25, wherein said reproducing means reproduces the first or the second image based on the flag signal.

27. An image reproducing apparatus according to claim 24, further comprising bit map memory means for storing the bit data.

28. An image reproducing apparatus according to claim 24, further comprising image memory means for storing the image data.

29. An image reproducing apparatus according to claim 24, wherein said reproducing means comprises a printer driver.

30. An image reproducing apparatus according to claim 24, further comprising a memory storing the image data and the bit map data.

31. An image processing apparatus according to claim 30, wherein said memory comprises a bit map memory storing the bit map data and an image memory for storing the image data, wherein said bit map memory and said image memory are separate elements.

* * * * *